United States Patent [19]

Appolonia, III

[11] Patent Number: 5,329,837
[45] Date of Patent: Jul. 19, 1994

[54] CONTINUOUS FIBER COMPOSITE ACOUSTIC DRUMSHELL

[76] Inventor: Michael D. Appolonia, III, 22 Tillson Ave., Highland, N.Y. 12528

[21] Appl. No.: 879,365

[22] Filed: May 7, 1992

[51] Int. Cl.⁵ .............................................. G03B 7/00
[52] U.S. Cl. .................................. 84/411 R; 264/257
[58] Field of Search ........................ 84/411 R, 452 P; 156/131; 264/257; 181/208

[56] References Cited

U.S. PATENT DOCUMENTS

| | | | |
|---|---|---|---|
| 4,173,917 | 11/1979 | Della-Porta | 84/411 R X |
| 4,184,407 | 1/1980 | Townsend | 84/411 R |
| 4,282,793 | 8/1981 | Muchnick | 84/414 |
| 4,842,787 | 6/1989 | Chess, Jr. et al. | 264/257 X |

Primary Examiner—Michael L. Gellner
Assistant Examiner—P. Stanzione

[57] ABSTRACT

This invention relates to the materials, method of construction, and design of a composite acoustic drum shell intended to enhance the sound quality of a drumhead. It involves the process of winding a continuous polisher saturated fiber around a symetrical mandrel to form the shape of the drumshell. The overall shape of the structure, the material selection, and the orientation of the fibers maximize the degree of coupling between the structure and the drumhead resulting in a resonating system. The shape of said mandrel may be advantageously varied to create different vibrational and acoustical properties for different size drumheads.

8 Claims, 3 Drawing Sheets

CONTINUOUS FIBER COMPOSITE ACOUSTIC DRUMSHELL

BACKGROUND OF THE INVENTION

Drum, in correct terminology, means an instrument in which the sound is produced by a membrane stretched over the opening of either a frame, or a hollow body of any shape. It is said hollow body which shall be refered to as a drumshell. The materials of construction of drumshells historically have been limited to wood. Wood suffers from the disadvantages of drying, cracking and inconsistent quality. Since drums are produced by laminating several plies of wood, delamination also can be a problem. Developments in composite materials have increased their versatility and offer the stiffness, low density, and uniformity required to be considered as a replacement for wood in musical instruments.

Hutchins of The Catgut Acoustical Society, Thompson of the C. F. Martin Company, and Haines of the University of South Carolina were among the first researchers to explore the possibilities of using composite materials in stringed instruments as top plates for violins and guitars. Their study involved an analysis of the vibrational deformation which occurs at the harmonic modes produced by the vibrating string. The mechanical properties of their top plates matched those of a conventional spruce plate. The use of composite materials in stringed instruments has been reported in U.S. Pat. No. 4,949,381. The Yamaha corporation recently reported on the construction of a composite prototype set of drums for a famous drummer. The drums, however, were constructed by a process other than the one now disclosed.

There is a distinct difference between the use of composite materials for the bodies of stringed instruments and drums. Stringed instruments have a definite tone due to the simple harmonic overtone structure that a vibrating string produces. These overtone frequencies are integral multiples of the fundamental frequency. Scientists' and engineers' knowledge of a strings vibration allows the determination of the required resonant frequencies for the design of a composite resonating structure.

The physics of drums is not as well understood. Only three reports formally address the physics of drums: a study in the 1930's by Raman of the modes of the Indian tabla, a small hand held drum; a study by Rossing in 1982 on the modes of a drumhead; and a later study by Rossing on the effect of air mass loading in a kettle drum on the modes of a drumhead (reported in Scientific American, 1982, volume 247). Rossing concluded that the drumheads modes are not integral multiples of each other, rather multiples of 1.59, 2.14, 2.3, 2.92, etc. None of the studies address the influence of the drumheads' modes on the drumshell or the drumshells' mechanical properties on the sound quality produced.

Extruded acrylic and polyvinylchloride drumshells have been reported, as well as one cast composite shell incorporating short glass fibers in an unsaturated polyester matrix. These were manufactured by processes other than filament winding and the materials used have no acoustic advantage. U.S. Pat. No. 4,282,793 describes a composite drum head, comprising polyaramide fiber fabric impregnated with a rigidifying amount of epoxy polymer. While this disclosure appreciates composites, it appears limited to the use of such in the drumhead membrane.

OBJECT OF THE INVENTION

It is a general object of this invention to produce an acoustically superior drumshell by incorporating a synthetic engineered material via a flexible process accommodating the yawing acoustical and vibrational requirements of different sized drums.

Another object is to provide a means of producing consistent quality drumshells by using reproducible synthetic materials and a fixed process for fabrication of each drum size. The wood used for laminants in wooden drums often contains knots and other natural imperfections.

Another object is to provide a drum which eliminates the disadvantages of cracking and delamination found in wooden drumshells while upholding the acoustic integrity found in the finest quality wooden drums.

A further object is to provide a process which allows variations of the drumshells' shape for establishing its effect on the sound produced.

A final object is to provide a drum that is inexpensive to build and lightweight due to the high strength of the composite material.

BRIEF DESCRIPTION OF THE INVENTION

The present invention provides a drumshell to which conventional drum hardware and drumhead may be attached. The drumshell is comprised of a composite material of continuous fiber filaments in an thermoset resin matrix. The filaments are oriented to provide the required stiffness for flexural vibration in the hoop direction while maintaining the mechanical strength required to support the force applied by the drumhead tension.

The invention incorporates the filament winding process as a means of constructing the drumshell. Filament winding is a process where continuous fibers are wrapped around a rotating mandrel. The mandrel is constructed to reflect the shape of the drumshell. This process provides a means of delivering said materials of construction to a variety of drumshell shapes with a circular cross section throughout.

DETAILED DESCRIPTION OF THE DRAWINGS

Figure 1:
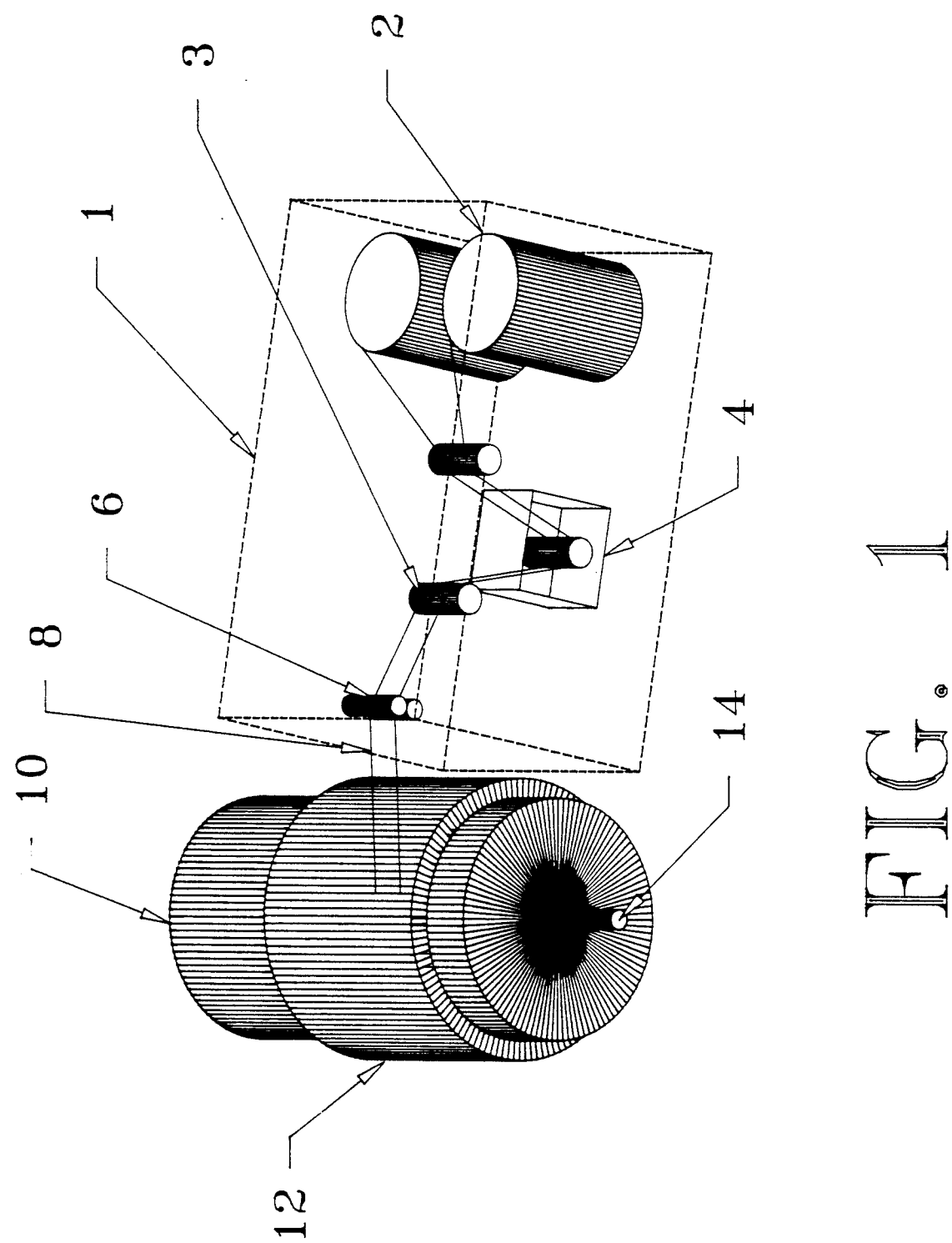
FIG. 1 is a schematic drawing of the process used to form the drumshell.
Figure 2:
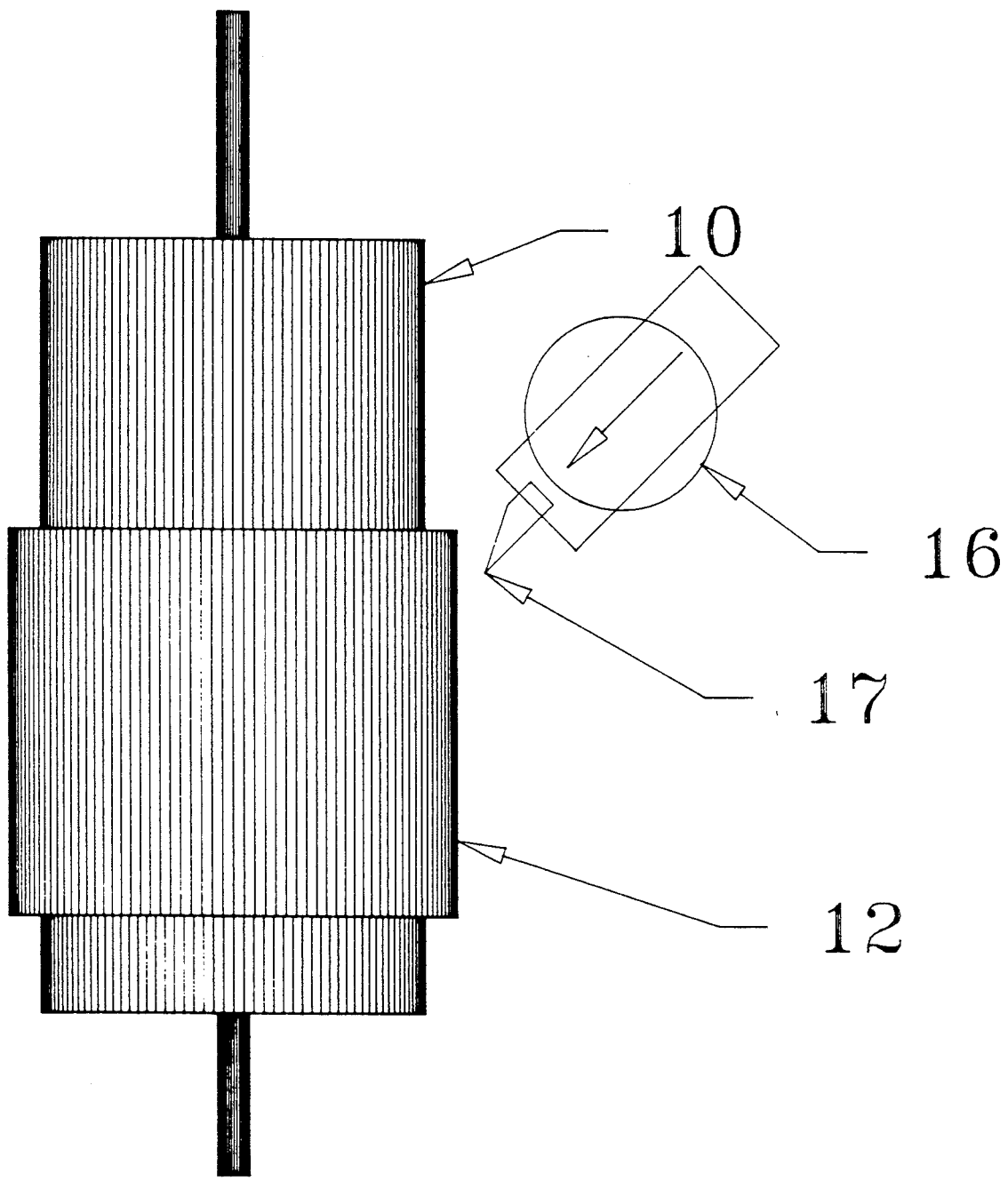
FIG. 2 is a schematic drawing of the process used to cut the cured drumshell to its final length and create a 45 degree bevel for the drumhead to act against.

FIG. 1 shows a schematic drawing of the filament winding process as applied to the drumshell 12. Graphite filaments spools 2 are loaded onto the filament delivery system 1. The modulus of elasticity of the graphite filaments is preferably 25 Msi but in some cases may advantageously range from 15 to 125 Msi. A preferred graphite fiber, for example, is the Union Carbide P-25 which is a pitch based carbon fiber with 2000 filaments per strand and a 25 million psi modulus. Several strands may be bunched together by the strand guides 3 to form a band. Some drumshells may require a range of band widths made of 1 to 30 strands. The strands are then fed by the rollers 3 into a thermoset resin bath 6. The resin used is preferably a low viscosity resin, e.g., an epoxy ranging from 350 to 1500 centipoise, mixed with a curing agent and an accelerator. A preferred epoxy is a diglycidyl ether of bisphenol-A. A preferred curing agent is methyl tetrahydrophtalic anhydride (MTHPA) but other agents such as methyl anhydride or metaphenylene diamine may be substituted. A preferred accelerator is benzyldimethylamine (BDMA) but, again, other accelerators may be substituted. The formulation is preferably 180 phr epoxy resin, 80 phr curing agent, and 1 phr accelerator. This formulation may vary depending on the working time required for different drum sizes. The strands are then directed through a pinch roller 6 which applies tension to the strands. Preferably, 1700 grams of tension should be applied to the strands, however, this may vary depending on the desired binding matrix-to-fiber reinforcement ratio. The mandrel is wound until 3 to 6 layers are achieved, producing a wall thickness of 0.125 to 0.25 inches, respectively.

The operation of the process is similar to a lathe, where the mandrel 10 is the rotating part, and the traversing tool is the filament delivery system 1. Preferably, the filaments are wound on the mandrel at an angle 70 degrees from the axis of rotation. Windings angle may vary from the mandrel rotating axis from near 0 degrees for hoop strength, to approach 90 degrees for axial strength.

The production mandrel is preferably made from rolled steel centered on a steel rod since it is reusable. Release agents such as wax, and certain plastic films aid in the removal of the part after curing. For production of different shaped drums, a variety of other choices are available. Soluble plaster offers the ability to be shaped by wiping, and is easily washed out after the part is cured. Frangible plasters offer rigidity for larger diameter drums. In these mandrels, a relatively thin wall of plaster, depending on the diameter of the cylinder, must be supported by a screen wrapped around a frame. A unique method of creating mandrel shapes is by winding rope around a central rod until the desired diameter is achieved, and smoothing the surface with plaster. After the part cures, the rope can be pulled out, leaving only the composite shell.

The drumshell, together with the mandrel may be cured by rotating it under a resistance type strip heater for about 7 hours. The heater is arranged along the length of the drumshell to deliver heat evenly. Finally, the drumshell is fully cured by placing it into an oven at about 350 degrees F. for about 2 hours.

The drumshell may be cut to the desired length by the use of a cutting tool 16. The rim of the drum has a 45 degree bevel directed inward toward the center of the drum. This is achieved by directing a carbide tipped tool 17 at an angle of 45 degrees through the drumshell as it is rotating. Finally it is forced off the mandrel with the assistance of any type of power press equipment.

Figure 3:
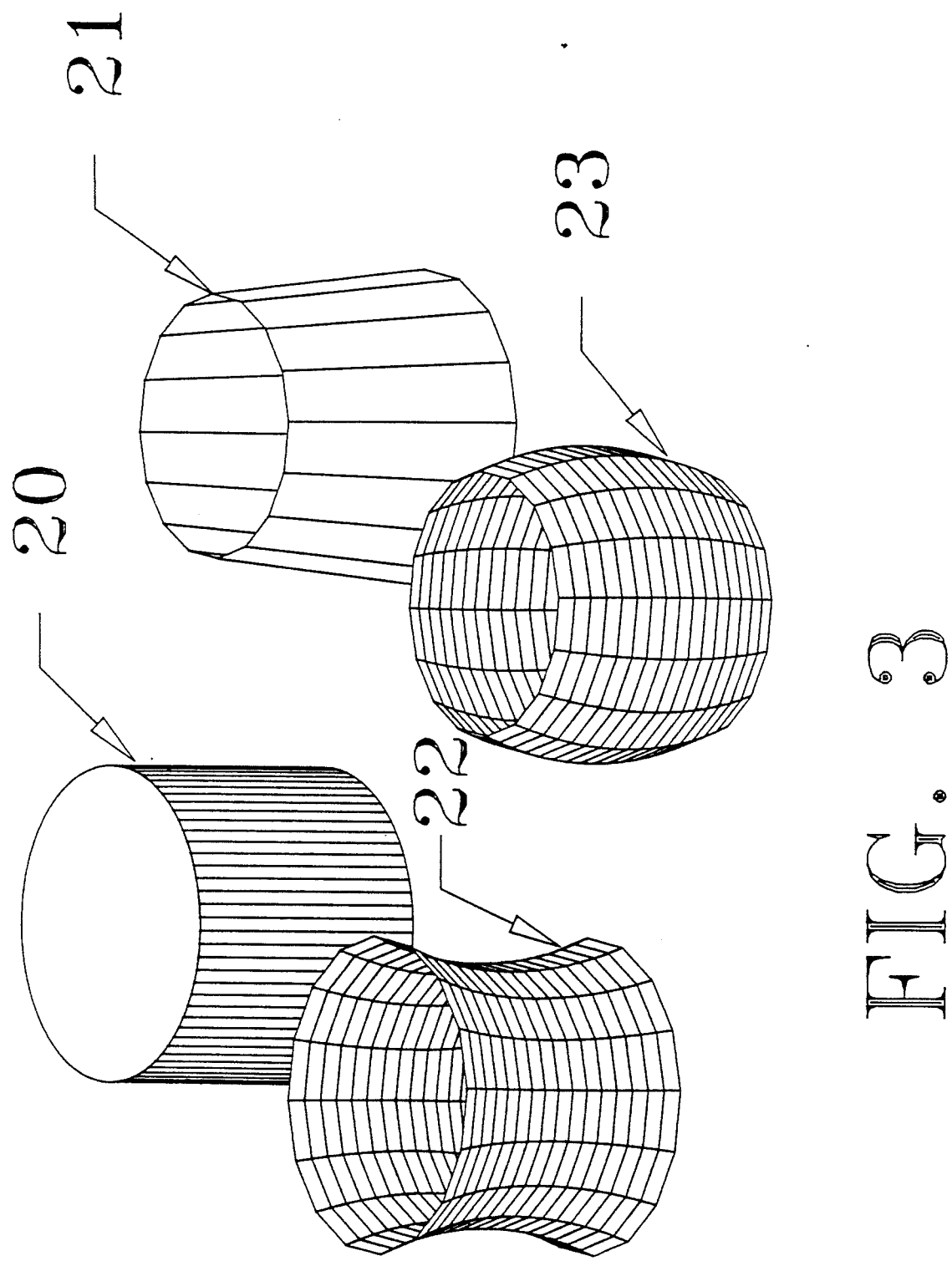
FIG. 3 is shows four possible drumshell shapes using the filament winding process.

This process allows the construction of a wide variety of drumshell shapes. The shapes shown in FIG. 3 include a cylinder 20, used in conventional drum sets, a conical shape 21, a hyperbolic shape 22, similar to the Indian tabla, and a barrel shape 23, similar to the shell of a conga or bongo.

The interaction of the drumshell and the drumhead have revealed that the dominant modes of 60 and 125 Hz in a 12 inch diameter drumhead, and the frequencies at which the degree of coupling between the drumhead and drumshell are a maximum are effected by the orientation and distance between the fibers within the composite drumshell. Therefore, a composite drumshell can be designed to enhance these dominant modes by controlling the shell modulus of elasticity through proper selection and arrangement of the filaments and polymer matrix and determining the overall shape of the shell. Accordingly the filament winding process can be applied advantageously to manufacture acoustically superior drumshells.

The design requirements are different for different drum sizes. Standard sized drumheads are available ranging from 6 to 32 inches in 1 inch increments. The vibrational requirements of each drumshell are unique for each drumhead. It has been revealed by Rossing that the overtone frequencies of a drumhead's modes are not harmonics, but multiples of 1.59, 2.16, 2.3, 2.92, etc. This is a result of the complex vibration in the vibrating membrane and is the cause of the sound of a drum being atonal. However, the overall sound of a drum does have a general tone. It has been revealed in a Masters Thesis by Appolonia III, that there is a resonant frequency in a 12" tom tom at 125 Hz that is the dominant tone of the drum. It has also been reported by Appolonia that a carbon fiber/epoxy drumshell, having a resonant frequency occurring close to 125 Hz, did "resonate" the sound of the drum and increase the "sustain". Modal testing of a continuous fiber composite drumshell and a wooden drumshell indicates a higher degree of coupling between the drumshell and the drumhead in the composite through a comparison of the frequency response of the drumshell when impacting on the drumhead.

The method of producing a properly designed drumshell based on causing it to have modes of vibration in the range of the modes of vibration of the drumhead which describes the drums general tone is outlined as follows. Initially, the modes of the drumhead in question are determined by the diameter and tension applied. The frequency of these modes may be easily determined by placing a shaker or audio speaker a distance from the drumhead and slowly sweeping a sinewave pulse through the audible frequency range. This will obviously excite some modes which describe the general tone of the drum when struck. Other modes which are excited are heard as inharmonic overtones when struck and are less audible. Another method is to determine the frequency response of the drumhead by placing an accelerometer on the stiffening rim of the drumhead and exciting it by either transient or continuous means. Frequency response is measured using an FFT signal analyzer.

Once the dominant resonant frequencies have been established, the drumshell may be designed to resonate with the drumhead as a system. Since the general tone of a drumhead is described by its lowest dominant mode, the first breathing mode of the drumshell may be shifted toward the drumhead modes caused by typical tunings. The equations defining the modes of vibration of a cylinder, hyperbola, and other overall shapes of the drumshell can be written, however the exact solutions exist only for a few simple geometric cases. However, if the structure is replaced by a collection of "elements" of finite size, the equations have an approximate solution. The set of linear second-order differential equations defining the vibration of a finite element model can be written in matrix form as:

$$[m]\{x\} + [k]\{x\} = 0$$

where:

[m] = mass matrix [k] = stiffness matrix

{x} = displacement vector {x} = acceleration vector

There are many computer programs available for determining the vibrational response of structures. The structure is defined in computer code and the calculation of the mass and stiffness matrices is done by the computer based on the mechanical properties of the materials. The mechanical attributes of the drumshell are represented in the spatial model and include properties such as modulus of elasticity, direction of the stiff reinforcement, mass, and damping. The modal analysis of a finite element model is used to determine the resonant frequencies. A preferred computer system for modal analysis is the Hewlett Packard 330 computer utilizing the SMS, Modal 3.0SE software. Varying the shape of the drum toward a hyperbola stiffens the structure while minimizing the wall thickness, hence, higher resonant frequencies. Varying the fiber orientation, i.e. the filament winding angle, toward the hoop direction increases the stiffness of the shell in the hoop direction, hence, increasing the natural frequency of the shell. Combinations of varying the overall shape, fiber selection, matrix selection, and fiber direction and subsequent modal analysis leads to a drumshell which produces longer sustain, higher sound pressure, consistent sound quality, and durability against environmental conditions. The filament winding process of wrapping polymer saturated fibers around symmetrical shapes, e.i. resembling cylinders, allows the freedom of design and experimentation for the optimum drumshell. It has been reported by Haden, Berkly School of Music Professor of Drums, that the sound of the said drum produced a preferable sound which "tends to radiate directly outward as opposed to dropping off", as opposed to other drums.

The above description shall not be construed as limiting the ways in which this invention may be practiced but shall be inclusive of many other variations that do not depart from the broad scope of the invention.

I claim:

1. A composite structure acoustic drumshell to which a drumhead is attached comprising a composite material of continuous fiber filament in a thermoset polymer matrix wherein the fibers are layered and angled in the drumshell, in relation to the drumhead, to maximize the degree of resonant frequency coupling between the acoustic shell and the drumhead.

2. The composite structure of claim 1 wherein the fibers are graphite fibers.

3. The composite structure of claim 1 wherein the thermoset polymer matrix is an epoxy polymer.

4. The composite structure acoustic shell of claim 1 wherein the acoustic shell is a cylinder.

5. The composite structure acoustic shell of claim 1 wherein the acoustic shell is a conical shape.

6. The composite structure acoustic shell of claim 1 wherein the acoustic shell is a hyperbolic shape.

7. A method of constructing a composite structure acoustic shell to which a drumhead may be attached comprising the steps of:

a. supplying a mandrel;
   b. supplying continuous fiber filaments;
   c. passing the continuous fiber filaments through a thermoset resin bath;
   d. rotating the mandrel to take up the filaments after passing through said resin bath wherein the filaments are layered onto the mandrel and angled in the acoustic shell to optimize the degree of sonic frequency coupling between the acoustic shell and the drumhead;
   e. curing the thermoset resin by heat.

8. The method of claim 7 further comprising directing a carbide tipped tool is into the acoustic shell at an angle of 45 degrees to the mandrel axis of rotation.

* * * * *